US008014081B2

(12) United States Patent
Watanabe et al.

(10) Patent No.: US 8,014,081 B2
(45) Date of Patent: Sep. 6, 2011

(54) CHROMATIC ABERRATION COMPENSATING IMAGE OPTICS

(75) Inventors: Yuko Watanabe, Saitama (JP); Takashi Sakamoto, Saitama (JP); Hiroyuki Taira, Saitama (JP); Seigou Nakai, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 11/500,985

(22) Filed: Aug. 9, 2006

(65) Prior Publication Data

US 2007/0002450 A1    Jan. 4, 2007

Related U.S. Application Data

(63) Continuation of application No. PCT/JP2005/001885, filed on Feb. 9, 2005.

(51) Int. Cl.
*G02B 9/08* (2006.01)

(52) U.S. Cl. .......................... 359/738; 359/691; 359/793

(58) Field of Classification Search .................. 359/601, 359/602, 69, 614, 691, 738, 793
See application file for complete search history.

(56) References Cited

U.S. PATENT DOCUMENTS

| 3,035,488 A | 5/1962 | Alden |
| 4,454,535 A | 6/1984 | Machida |
| 5,541,779 A | 7/1996 | Choi |
| 5,646,788 A * | 7/1997 | Bietry ........................... 359/740 |
| 6,338,559 B1 | 1/2002 | Williams et al. |
| 2005/0088762 A1* | 4/2005 | Ohashi .......................... 359/754 |

FOREIGN PATENT DOCUMENTS

| JP | 57-037990 | | 3/1982 |
| JP | 05-110938 A | | 4/1993 |
| JP | 08-179105 A | | 7/1996 |
| JP | 2845821 B2 | | 1/1999 |
| JP | 11-125849 | * | 5/1999 |
| JP | 11-125849 A | | 5/1999 |

* cited by examiner

*Primary Examiner* — Joshua L Pritchett
(74) *Attorney, Agent, or Firm* — Jacobson Holman PLLC

(57) ABSTRACT

An imaging optics capable of compensating for chromatic aberration is provided with a light shielding means in a surface peripheral area of a certain lens element in a lens system so as to block a light flux of a specified wavelength range, thereby eliminating chromatic aberration in halo of the light flux of the specified wavelength range when it passes the periphery of the lens system. Thus, the invention provides the imaging optics that, without an increase in the number of pieces of lens elements and without a use of an expensive specified low-dispersion glass material, in contrast with the prior art imaging optics of the same optical performances, well compensates for chromatic aberration, especially, in halo.

9 Claims, 26 Drawing Sheets

CHROMATIC ABERRATION COMPENSATING IMAGE OPTICS

This is a continuation of PCT/JP2005/001885 filed 9 Feb. 2005 and published in Japanese.

FIELD OF THE INVENTION

The present invention relates to a chromatic aberration compensating image optics compatible with large aperture lenses of wide angle as well as with various standard ones, and more particularly, to a chromatic aberration compensating image optics capable of blocking rays of a specified wavelength range to correct chromatic aberration.

BACKGROUND OF THE INVENTION

Imaging optics for cameras available for this decade, such as monitoring cameras generally called CCTV and high resolution digital cameras of mega pixels, for example, of 2 million or even higher, often encounter an undesirable phenomenon figured as chromatic blurring where the feature of high resolution results in residual lateral chromatic aberration being developed conspicuously in an image. Especially, in leaving an aperture stop loosened to let light beams come in and get an image of a small but brightly irradiating object in a dark background, for instance, a blue chromatic blur gets conspicuous surrounding such a brightly irradiating object in the resultant image.

"Larger aperture", "downsizing", and "reduced cost" are universal goals continually pursued, and it is desired to use a reduced number of pieces of lens and/or to avoid a use of special low-dispersion glass material.

A compound lens of a glass lens having its surface laid with resin layer to serve as optics in the prior art has come to be broadly used for optics of cameras and office electronic machines like a copying machine. With such a compound lens of the glass lens coated with resin layer, the resin layer is defined, circumferentially departing from a valid range of the resin layer that works for the practical imaging, in order to attain the desired figure tolerance within the valid range of the resin layer suitable as the optics.

Specifically, the resin layer, when precisely defined, unavoidably has some part with a defect, such as figure dullness, that fails to attain the required figure tolerance as the optics, and for the reason, the resin layer spreads considerably beyond the valid range although useless for the imaging in practice. The glass lens itself, laminated with the resin layer, must have a greater outer diameter beyond the range the resin layer occupies. This means the existence of an optical surface area outside the valid range that does not contribute to the imaging, which brings about flare.

Rays of incident light, after passing the periphery of the compound lens with the resin layer, are refracted differently from the direction in which a primary valid light flux contributing to the imaging is done, and resultantly, this may cause flare light in the imaging plane such as a film surface or a CCD surface. As with the optics incorporating such a compound lens having the resin layer thereon, the inventors find a necessity of preventing the flare resulted from the part other than the valid range in the compound lens.

With a lens but the compound lens coated with the resin layer thereover, a light shielding member, which serves also as a lens holder, may be provided almost reaching the boarder of the valid range, so as to block the undesired light that may cause the above-mentioned flare. Such a compound lens, however, is so soft in a surface of the resin layer to affect the figure precision within the valid range, and therefore, the means of providing the light shielding member is not suitable. Another means of coating or optical blacking cannot be alternative because of an almost mirror-like surface of the resin layer.

In the light of the above-mentioned circumstances, alternatively disclosed is a compound lens that is comprised of a glass lens, a resin layer coating the glass lens on its surface to turn the simple glass lens to a compound lens, and a light shielding member of low transmissivity to visible light in position between the glass lens and the resin layer, departing from a valid range in the periphery of the lens apart from the optical axis (e.g., see Patent Document 1 listed below). By virtue of such a compound lens, flare caused by a light flux passing outside the valid range can be effectively obviated.

In addition to that, an optical aperture stop useful to avoid residual aberration in the optics is disclosed in Patent Document 2 listed below. This type of a lens architecture should have optics requirements, in advance, of a relatively low brightness, a narrow field angle, and a symmetrical lens arrangement fore and after about an aperture stop. The one disclosed in Patent Document 2 preconditions a Gaussian type of the similar architecture where a filter is in the midst between fore and rear groups of lenses, having a plurality of divided areas that respectively permit light of varied wavelengths to be transmitted, and such a filter is segmented, including a center circular area and a peripheral annular band area.

This kind of technology is further disclosed in Patent Document 3 listed below as implemented in a picture optics having a lens with a light shielding film so as to reduce abaxial aberration. In a prior art as in Patent Document 4, furthermore, a projection color image display apparatus having a wavelength-selective aperture stop is set forth.

Furthermore, Patent Document 5 listed below teaches a television camera lens apparatus where coating is laid over and integrated with a fore group lens element so as to serve as a filter area shaped in a circle with a predetermined radius about the optical axis.

Patent Document 1: Japanese Patent Preliminary Publication No. H8-179105,

Patent Document 2: Japanese Patent Preliminary Publication No. H11-125849,

Patent Document 3: Japanese Patent No. 2846821,

Patent Document 4: Japanese Patent Preliminary Publication No. S57-37990, and

Patent Document 5: Japanese Patent Preliminary Publication No. H5-110938.

In the compound lens disclosed in the above-identified Patent Document 1, a development of the flare can be effectively prevented, but there is no effort to reduce chromatic aberration, especially, to compensate for chromatic aberration components of halo. The "halo" means dimensions of light dispersed in some dimensional space instead of converging to a single spot because a light flux emitted from a single spot of an object and incident upon the lens is refracted due to various aberrations such as spherical aberration.

The currently available imaging optics of relatively large aperture, downsized, and of reduced cost, which is suitable for a monitoring camera and a high-resolution digital camera, is at greater manufacturing cost because of devices of adding lens elements, and/or, using special low-dispersion glass material for reducing the chromatic aberration in halo.

The invention set forth in Patent Document 2 teaches an almost symmetrical type of the optics architecture about the centered optical aperture stop, as stated above, where simply a compensating filter is located in the position of the optical aperture stop around the midst between fore and rear groups of lenses. In general, optical lens, as it is greater in aperture stop and greater in field angle, develops the flare more in an upper portion of the incident light flux closer to its upper limit line, namely, in a portion of the incident light flux converging downward to a focusing plane, and the upper portion of the incident light flux propagates closer to the optical axis rather than its upper limit line when it passes the aperture stop in the middle of the lens elements. An essential condition for the compensation is making the upper portion of the light flux propagate in the periphery of the filter, and nevertheless, the invention in the Patent Document 2 is defective in that it cannot be applied to a lens of large field angle and of large aperture since the upper portion of the incident light flux where abaxial beams are at greater incident angles propagate hardly passes the periphery of the filter defined approximately in a doughnut shape. The upper portion of the light flux can pass the periphery of the filter if a center region of the filter is decreased, instead enlarging its periphery, but this results in the light having its greater amount cut off, which cannot be a good trade-off between the anti-flare effect and elicited demerits such as color imbalance. To avoid that, the filter must have its periphery reduced in proportion to the reduction of its center region, and the resultant filter looses its merit and works like a dark lens at most. As a consequence of overcoming this problem, however, the resultant optics can be applied only to a telescopic lens of small incident angle.

When the coated filter is incorporated in the optics, incident properties of the coating bring about varied results such as a wavelength deviation and a performance degradation, depending upon an incident angle. The filter, when located in the position as described in Patent Document 2, leads to a variation in the incident angle between axial and abaxial light fluxes, and this causes a deteriorated effect of the compensation for chromatic aberration components. When applied to a generic lens of a non-symmetrical optics architecture, the filter brings about the greater variation in the incident angle, and this causes a considerably poorer compensation for chromatic aberration components.

For these reasons, an effective and well-balanced reduction of the chromatic aberration components, especially, those in the halo, cannot be conducted, and the compensation for the chromatic aberration components is left insufficient.

The above-identified Patent Documents 3 and 4 disclose the similar.

A television camera lens apparatus disclosed in Patent Document 5 relies on a technology of creating a coating layer serving as a filter in a surface center area of a lens element in fore or rear group of lenses so as to reduce a transmissivity in the center area of the lens element. The filter position is just opposite to the present invention, and thus, it is impossible to reduce the chromatic aberration components of the halo developed in the peripheral area of the lens.

The present invention is made to overcome the aforementioned disadvantages in the prior art, and accordingly, it is an object of the present invention to provide an imaging optics applicable to a non-symmetrical optics architecture, which is needless to add a lens element and use a expensive special low-dispersion glass material to advantageously compensate especially for chromatic aberration components in comparison with the prior art imaging optics of the similar optical performances.

It is another object of the present invention to provide an imaging optics compensating for chromatic aberration components of halo by means of an improvement over a diurnal-nocturnal lens eliminating a latent defocusing in visible and near infrared wavelength ranges and over an ultraviolet rays compatible lens eliminating a latent defocusing in visible and near ultraviolet wavelength ranges both of which, even when made of expensive special low-dispersion glass material, fail in some way to compensate well for the chromatic aberration components in halo.

It is further another object of the present invention to provide an imaging optics efficiently eliminating chromatic aberration components in halo by means of a disposition of a light shielding means in an area where light flux desired to remove concentrates in the periphery of a lens system, namely behind an aperture stop in a practical embodiment.

It is still another object of the present invention to provide an imaging optics compensating well for chromatic aberration components in halo without losing a color balance in a resultant image in the event of a significantly conspicuous chromatic aberration in halo of a light flux, by means of a light shielding means capable of covering a wider wavelength range to shield as it is closer to the outermost periphery.

SUMMARY OF THE INVENTION

A first invention of this application is an imaging optics capable of compensating for chromatic aberration. The imaging optics is provided with a light shielding means in a surface peripheral area of a certain lens element in a lens system so as to block a light flux of a specified wavelength range, thereby eliminating chromatic aberration in halo of the light flux of the specified wavelength range when it passes the periphery of the lens system.

A second invention of this application is an imaging optics capable of compensating for chromatic aberration. The imaging optics has a lens system consisting at least of fore and rear groups of lenses, and a light shielding means located in a peripheral area of the lens system so as to block a light flux of a specified wavelength range when it passes the peripheral area of the lens system. The light shielding means is provided in a surface area of a certain lens element of the rear group of lenses or even behind of the same at and in the vicinity of a position where rays of the light flux incident upon the lens system make almost the same incident angle, so that the light flux of a specified wavelength range can decrease in chromatic aberration components when it passes the peripheral area.

A third invention of this application is a lens means capable of compensating for chromatic aberration. The lens means has a lens system consisting at least of fore and rear groups of lenses, and a light shielding means located in a peripheral area of the lens system so as to block a light flux of a specified wavelength range when it passes the peripheral area of the lens system. The light shielding means is provided in a surface area of a certain lens element of the rear group of lenses or even behind of the same at and in the vicinity of a position where rays of the light flux incident upon the lens system are almost identical in height from the optical axis, so that the light flux of the specified wavelength range can decrease in chromatic aberration components when it passes the peripheral area.

An embodiment of the present invention is further characterized as follows:

The light shielding means is an optical filter having a wavelength-selective absorber in its periphery.

The light shielding means is a coating having a wavelength-selective reflector in a superficial periphery of an optical element of the lens system.

The specified wavelength range is that of color blue.

The light shielding means exhibits a transmissivity property that the means covers a wider wavelength range to block as it is closer to the outermost periphery in the lens system.

The light shielding means is a planar optical filter having its almost doughnut-shaped periphery coated to show a predetermined transmissivity.

The light shielding means is a coating layer provided in a certain lens element of the lens system, and the coating layer is in position of a peripheral area of the lens element, exhibiting a predetermined transmissivity.

In accordance with the present invention, an imaging optics can be manufactured without an increase in the number of pieces of lens elements and without a use of an expensive specified low-dispersion glass material, in contrast with the prior art imaging optics of the same optical performances, especially in well compensating for chromatic aberration components.

In some cases where used are a diurnal-nocturnal lens eliminating a latent defocusing in visible and near infrared wavelength ranges or/and an ultraviolet rays compatible lens eliminating a latent defocusing in visible and near ultraviolet wavelength ranges, those lenses, even when made of expensive special low-dispersion glass material, often fail to compensate well for the chromatic aberration components in halo. In accordance with the present invention, however, the imaging optics can compensate well for the chromatic aberration components in halo.

In the event of very conspicuous chromatic aberration components in halo of a light flux, using a light shielding means capable of covering a wider wavelength range to block as it is closer to the outermost periphery, the chromatic aberration in halo can well be compensated without a color imbalance in a resultant image.

DETAILED DESCRIPTION OF THE INVENTION

Figure 1:
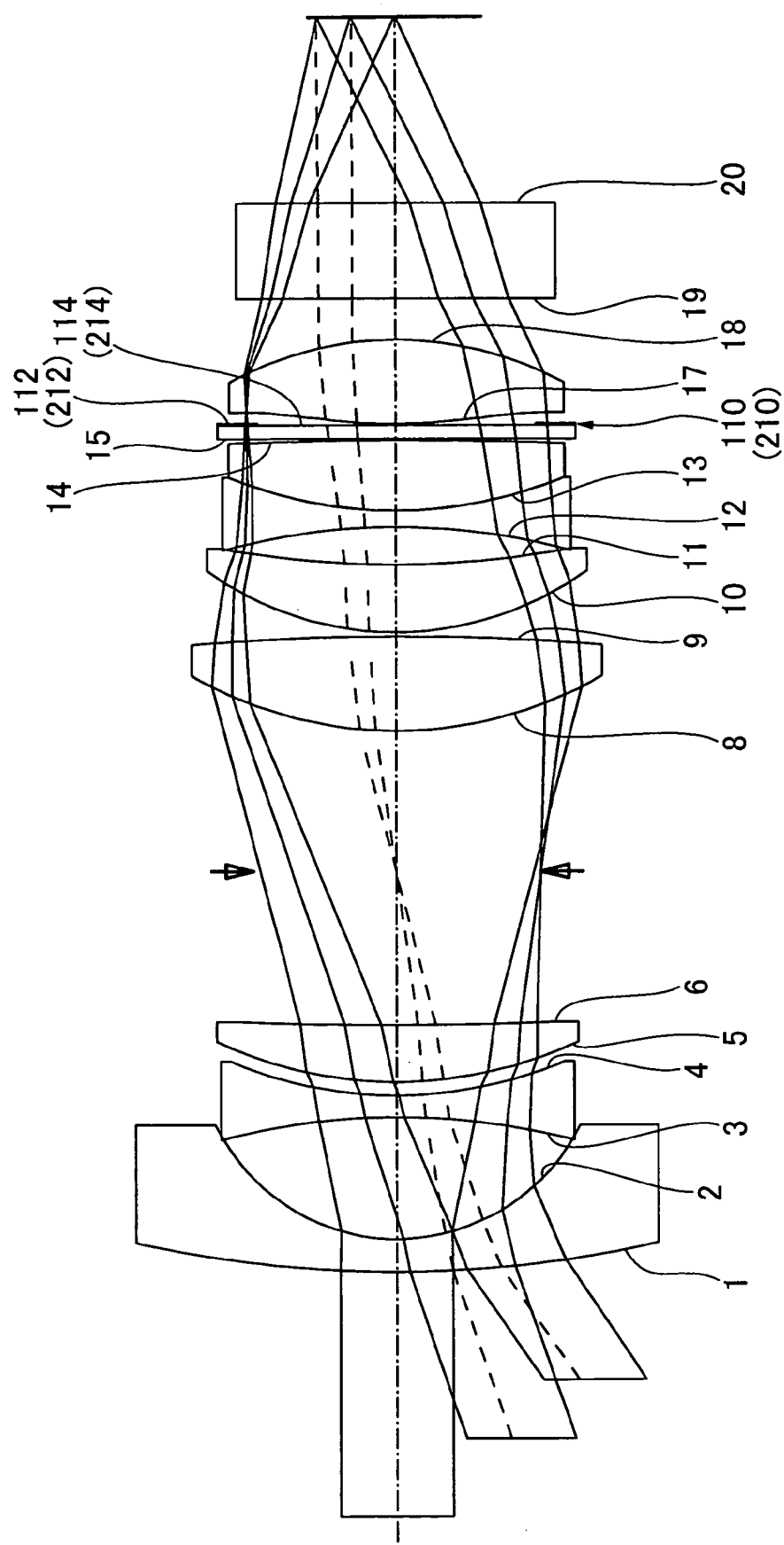
FIG. 1 is a diagram illustrating a first preferred embodiment of an imaging lens system according to the present invention.

The best mode of the invention to implement will now be described.

Embodiments of the present invention has a conspicuous feature that a multi-lens-group optics is provided with a filter or a coating layer in a lens element of a rear lens group so as to block rays of an axial light flux at the same distance away from the optical axis, rays of the axial light flux incident at the same angle, and rays of an abaxial light flux, thereby reducing or eliminating chromatic aberration components, namely, those in halo, in the light flux of a specified wavelength range as it passes the periphery of a lens system of the optics.

| Number of Lens Piece Surface | Radius of curvature | Distance | Nd | ν |
| --- | --- | --- | --- | --- |
| 1 | 43.0000 | 1.2 | 1.77250 | 49.6 |
| 2 | 7.2750 | 4.5 | 1 | |
| 3 | −24.5703 | 0.8 | 1.69680 | 55.5 |
| 4 | 15.2361 | 0.5 | 1 | |
| 5 | 15.2392 | 2.1 | 1.84666 | 23.8 |
| 6 | 154.7140 | 5.7154 | 1 | |
| Aperture Stop | ∞ | 5.2065 | 1 | |
| 8 | 14.5746 | 3.5 | 1.63854 | 55.4 |
| 9 | −89.5954 | 0.15 | 1 | |
| 10 | 11.5187 | 2.5 | 1.63854 | 55.4 |
| 11 | 33.3420 | 1.4 | 1 | |
| 12 | −23.5330 | 0.6 | 1.84666 | 23.8 |
| 13 | 15.5161 | 2.6 | 1.58913 | 61.2 |
| 14 | −159.3129 | 0.05 | 1 | |
| 15 | ∞ | 0.1 | 1.51633 | 64.2 |
| 16 | ∞ | 0.05 | 1 | |
| 17 | 17.9428 | 3.1 | 1.58313 | 59.4 |
| 18 | −12.5328 | 1.5 | 1 | |
| 19 | ∞ | 3.5 | 1.51633 | 64.2 |
| 20 | ∞ | 6.782 | 1 | |
| Imaging Plane | ∞ | | | |

Configured in this way along with either the filter or the coating layer shaped approximately in doughnut, the lens system can be relatively compact without the increased dead space because of a disposition of the filter or the coating layer in position where the rays of the incident flux are at the same distance from the optical axis or where they are incident on the rear lens group at the same angle, such location usually being likely to be complicated in architecture in the vicinity of an aperture stop. Thus, in comparison with the prior art technology, the resultant optics can be downsized and simplified in architecture, and effectively reduce chromatic aberration components, especially, those in halo.

Thus, the optical filter is, when used as the light shielding means, preferably located in the position where the rays of the incident light flux are at the same distance from the optical axis, or otherwise, the coating layer serving as the light shielding means is appropriately located in the position where the rays of the incident light flux are at the same angle. In this way, the undesired incident beams of the axial and abaxial light fluxes can be effectively blocked.

Embodiment 1

Provided below are optical data on a first preferred embodiment of an imaging optics capable of compensating chromatic aberration according to the present invention. A focal length is 4.95 mm, an F-number is 1.2, and a half field angle is 38.1 degrees.

| The 17th Surface - Coefficient of Aspherical Surface | |
| --- | --- |
| a | 0 |
| b | −4.71971E−04 |
| c | −6.77838E−10 |
| d | 2.03670E−12 |
| e | 1.09188E−10 |

An aspherical surface can be figured with a radius of curvature R at the center of the surface and a positive direction x of the light progressing. Assuming that a height from the optical axis is designated by y, a variation in a direction of the optical axis (an axis passing the center in common for all pieces of lens elements) can be expressed in the formula as follows:

$$x = \frac{(1/R)Y^2}{1+\sqrt{1-(Y/R)^2}} + aY^2 + bY^4 + cY^6 + dY^8 + eY^{10} \quad (1)$$

Figure 2:
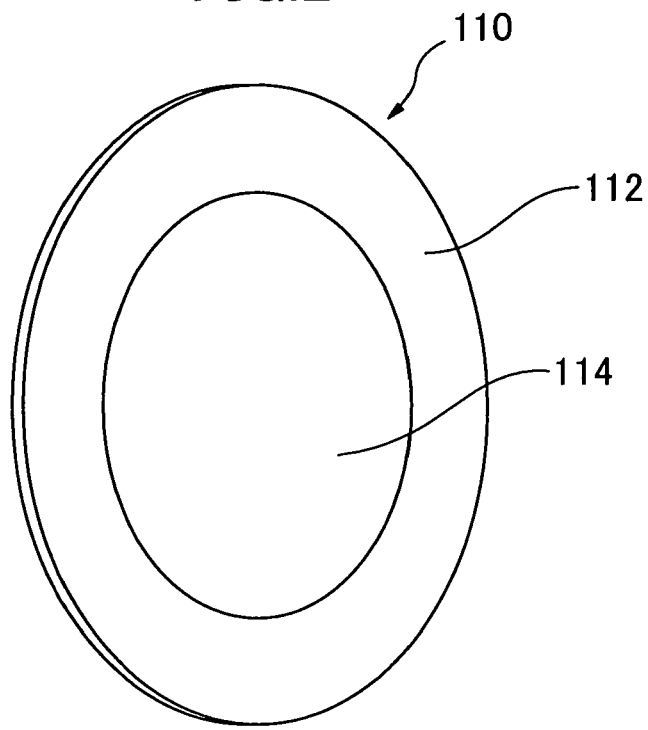
FIG. 2 is a perspective view of an optical filer, exemplary showing the sixteenth and seventeenth major surfaces from the foremost lens piece in the first embodiment of the imaging lens system.

FIG. 1 is a diagram illustrating the first embodiment of the imaging lens system. FIG. 2 is a perspective view of a disc-shaped optical filter 110, illustrating fifteenth and sixteenth lens surfaces of a lens piece in the first embodiment of the imaging lens system. The doughnut-shaped peripheral area in FIG. 2 is a filter 112 having an optical property as exhibited by a transmissivity provided in FIG. 3, and the filter is defined, for instance, by coating glass plate so as to have the property as in FIG. 3. The center of the lens piece is a light transmitting area 114 which may be covered with an anti-reflection film, as required.

Figure 4:
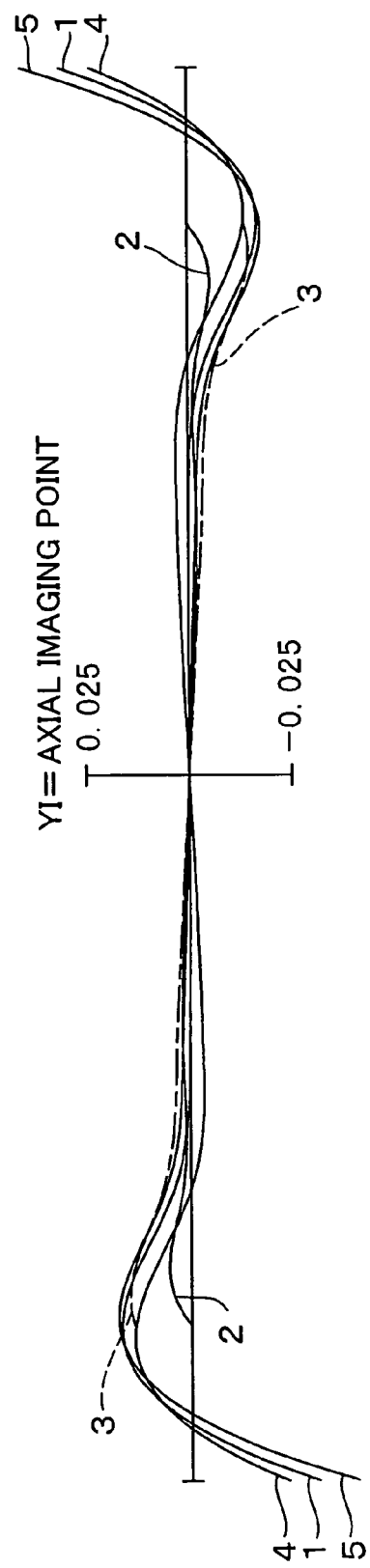
FIG. 4 depicts lateral aberration of an axial imaging point in the first embodiment of the imaging lens system according to the present invention.
Figure 5:
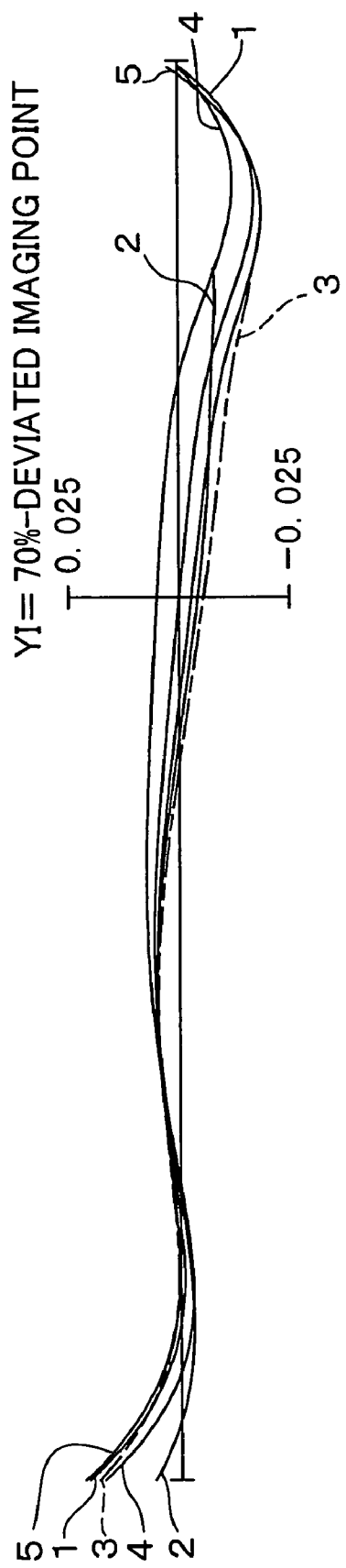
FIG. 5 depicts lateral aberration of a 70%-deviated imaging point in the first embodiment of the imaging lens system.
Figure 6:
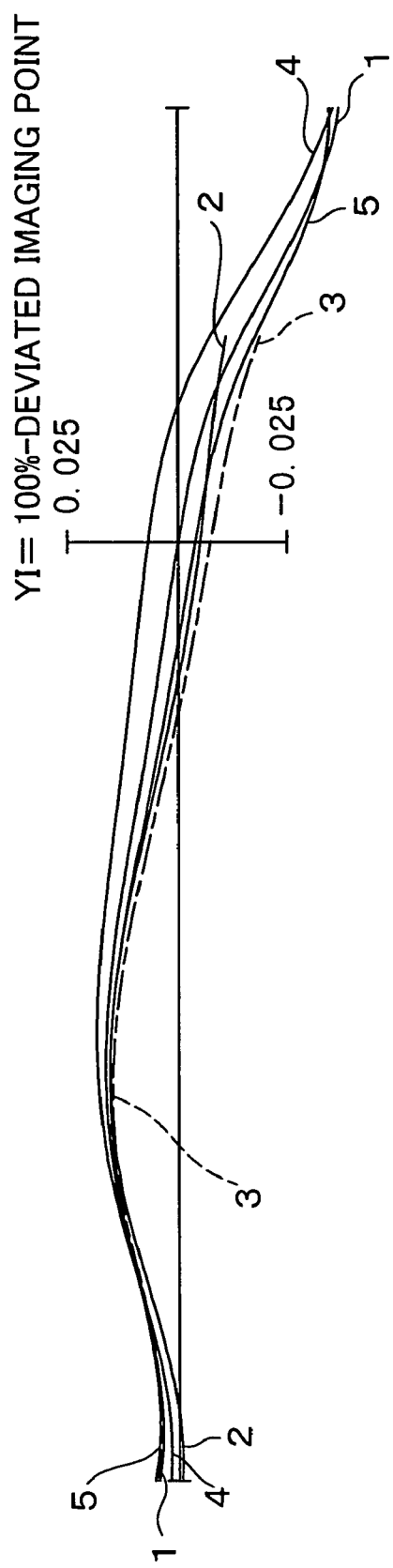
FIG. 6 depicts lateral aberration of a 100%-deviated imaging point in the first embodiment of the imaging lens system.

FIG. 4 to FIG. 6 depict lateral aberration of the first embodiment of the imaging lens system. In FIGS. 4 to 6, graphs 1 to 5 show lateral aberration for light beams of 587.56 nm wavelength, 435.84 nm wavelength, 486.13 nm wavelength, 656.28 nm wavelength, and 546.07 nm wavelength, respectively.

FIG. 4 depicts the lateral aberration of an axial imaging point. FIG. 5 depicts the lateral aberration of the 70%-deviated imaging point. FIG. 6 depicts the lateral aberration of the 100%-deviated imaging point. In these drawings of the aberration, rays of an incident light flux passing a peripheral area of the imaging lens system among those depicted in the graph 2 (435.84 nm) and the graph 3 (486.13 nm) is blocked by the filter means 112 without reaching the imaging plane and do not develop significant halo.

Figure 7:
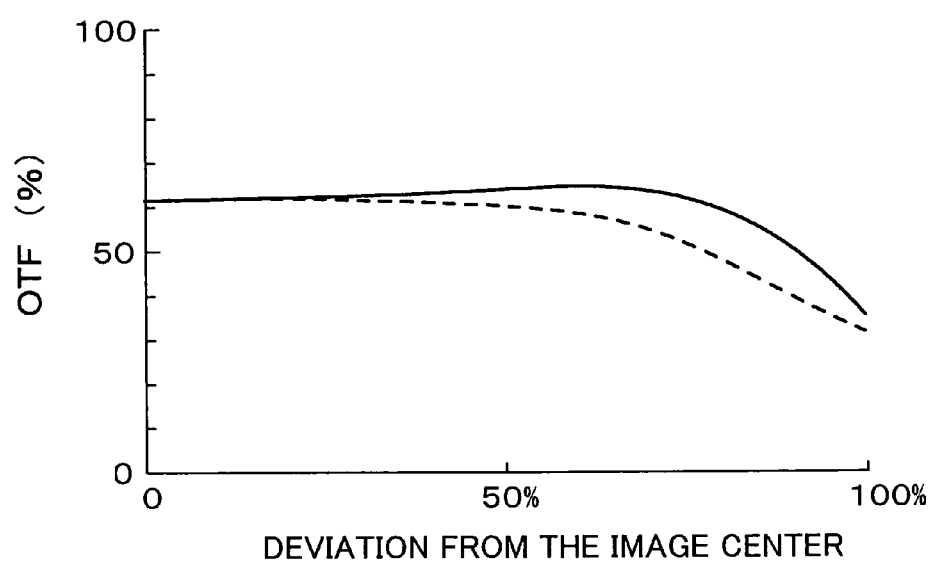
FIG. 7 is a graph where a geometrical optical OTF is at a level of 50/mm in the first embodiment of the imaging lens system according to the present invention.

FIG. 7 shows a geometrical OTF of 50/mm in the first embodiment of the imaging lens system. The horizontal axis denotes an incremented deviation from the image center while the vertical axis designates an OTF. The solid line in the graph is for a sagittal image surface while the broken line is for a meridional image surface.

Alternatively, the optical filter of the first embodiment of the imaging lens system can be replaced with its modification of a doughnut-shaped glass plate disposed as the filter 112 is.

Embodiment 2

Figure 8:
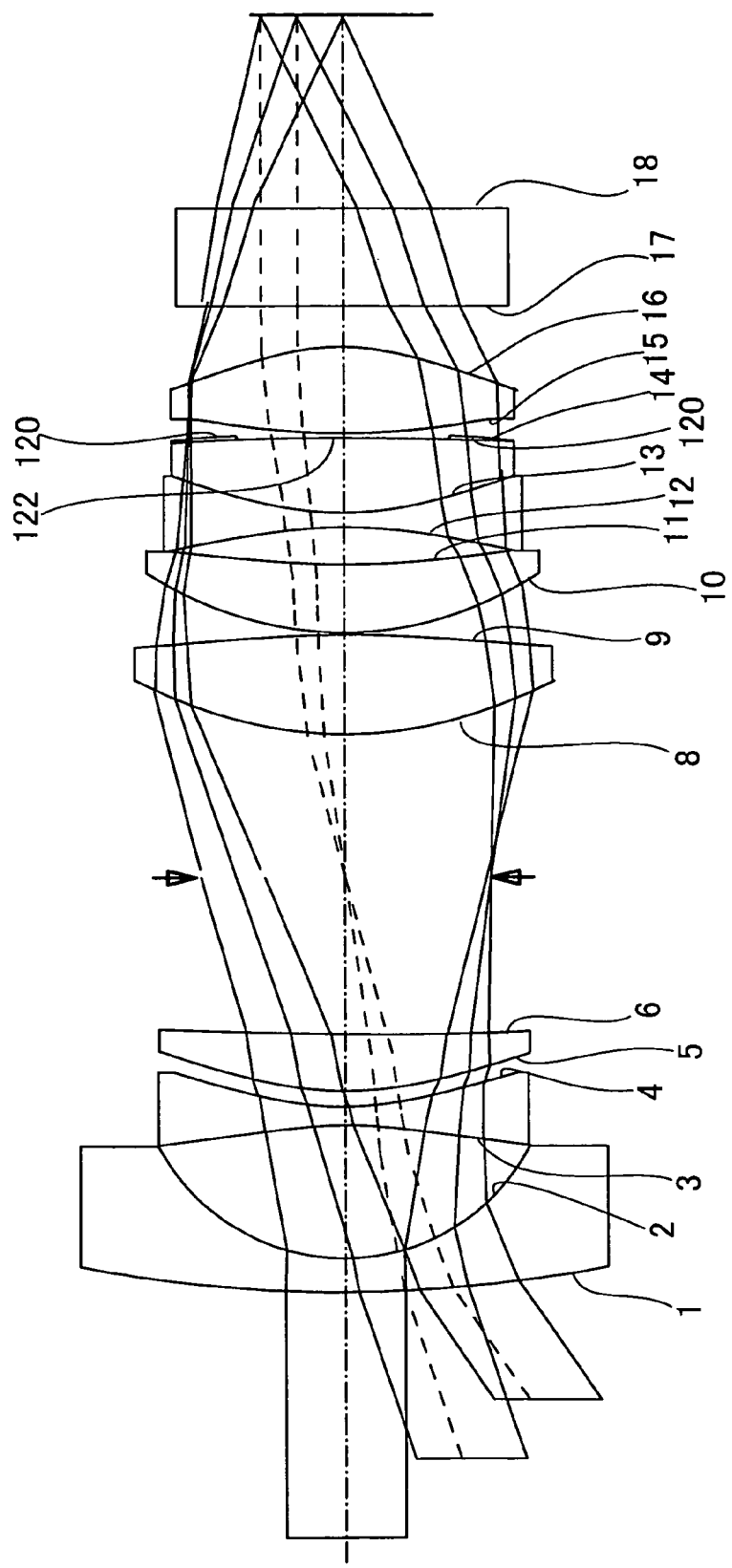
FIG. 8 is a diagram illustrating a second preferred embodiment of the imaging lens system according to the present invention.

Described below will be a second preferred embodiment of the imaging optics capable of compensating chromatic aberration in accordance with the present invention. A focal length is 4.95 mm, and an F-number is 1.2. FIG. 8 is a diagram illustrating the second embodiment of the imaging lens system. This embodiment has a structure where the imaging lens system in a comparison example 1 described later has its lens piece covered in its surface directly with a coating later also described below.

Figure 9:
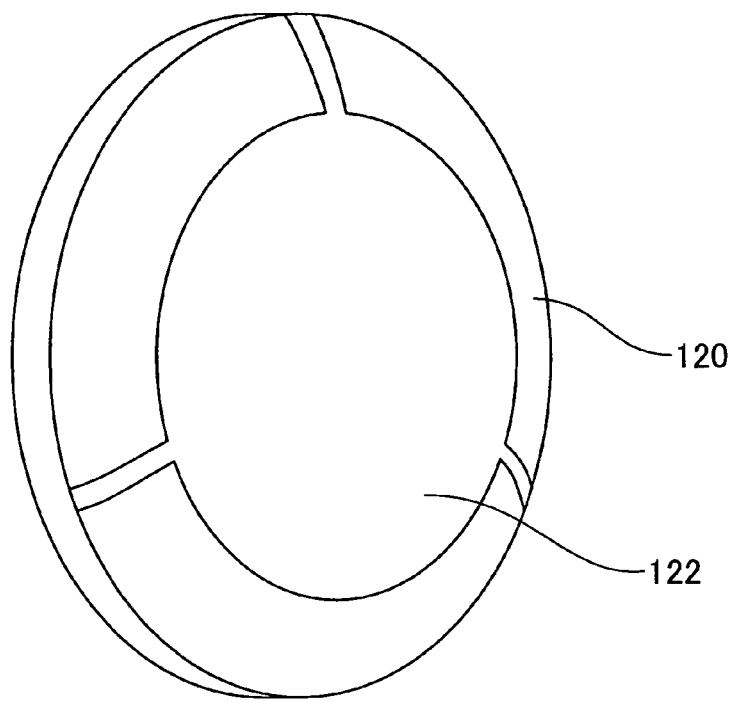
FIG. 9 is a perspective view of a lens piece having its part coated in the second embodiment of the imaging lens system.
Figure 10:
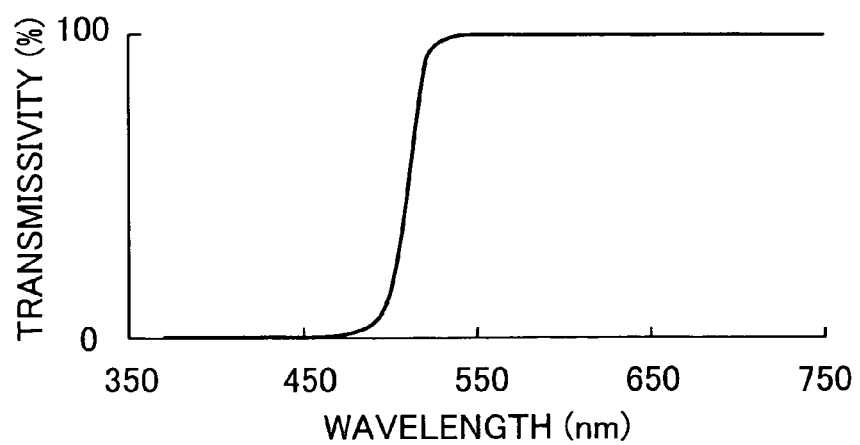
FIG. 10 is a graph of a transmissivity of a coating in the second embodiment of the imaging lens system according to the present invention.

FIG. 9 shows the second embodiment of the imaging lens system having a lens piece provided with a coating 120 in a doughnut-shaped peripheral area of its fourteenth surface, the coating 120 exhibiting an optical property of a transmissivity as illustrated in FIG. 10. The center of the lens piece is a light transmitting area 122, which can be coated with an anti-reflection film, as required. The coating 120 is segmented at every 120-degree position, and such discrete positions between the adjacent segments is occupied by supporting members (not shown) to lay vapor deposition mask thereon and avoid coating the light transmitting area 122.

Figure 11:
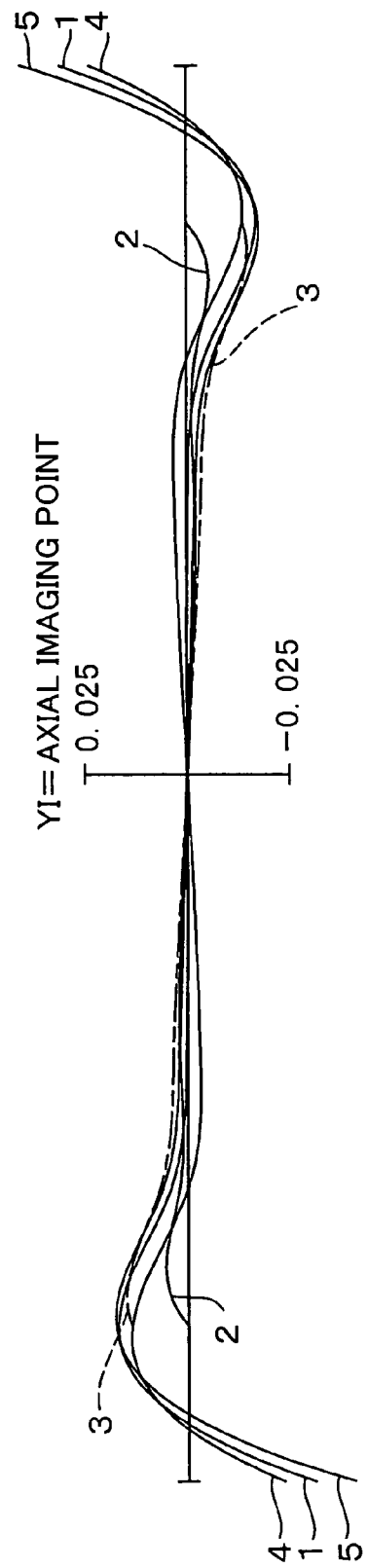
FIG. 11 depicts lateral aberration of an axial imaging point in the second embodiment of the imaging lens system according to the present invention.
Figure 12:
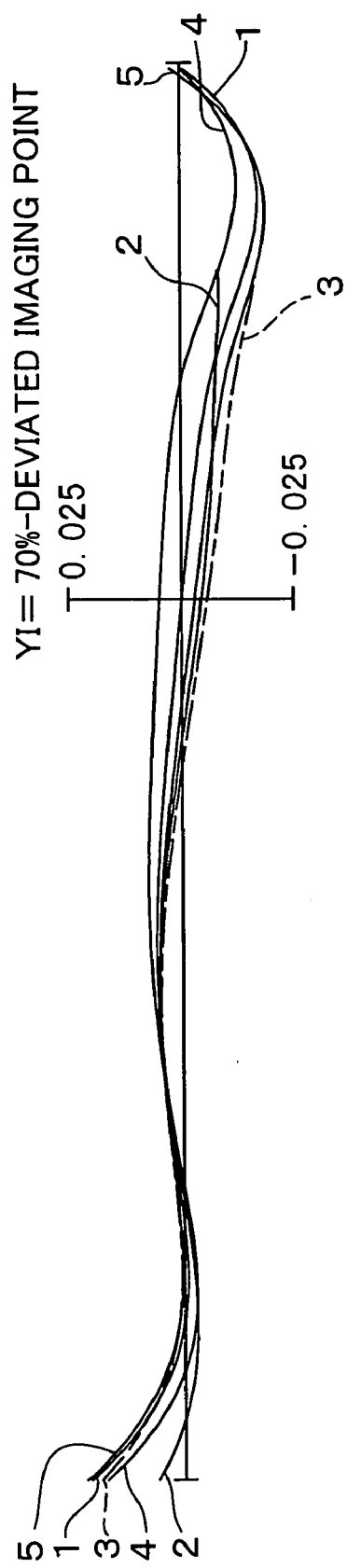
FIG. 12 depicts lateral aberration of a 70%-deviated imaging point in the second embodiment of the imaging lens system.
Figure 13:
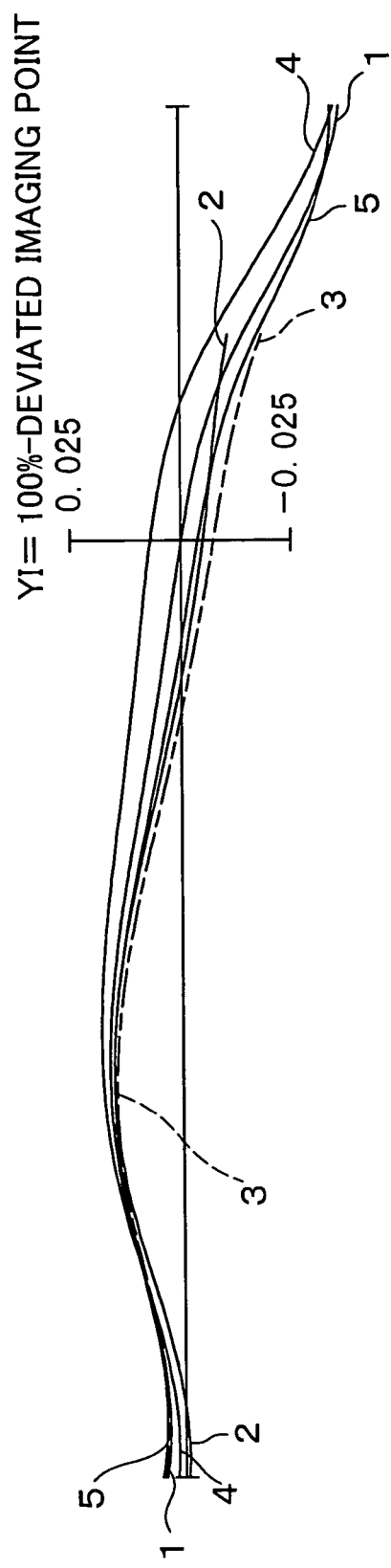
FIG. 13 depicts lateral aberration of a 100%-deviated imaging point in the second embodiment of the imaging lens system.

FIG. 11 to FIG. 13 depict lateral aberration of the second embodiment of the imaging lens system. In FIGS. 11 to 13, graphs 1 to 5 show lateral aberration for light beams of 587.56 nm wavelength, 435.84 nm wavelength, 486.13 nm wavelength, 656.28 nm wavelength, and 546.07 nm wavelength, respectively.

FIG. 11 depicts the lateral aberration of an axial imaging point. FIG. 12 depicts the lateral aberration of the 70%-deviated imaging point. FIG. 13 depicts the lateral aberration of the 100%-deviated imaging point. In these drawings of the aberration, rays of an incident light flux passing the peripheral area of the imaging lens system among those depicted in the graph 2 (435.84 nm) and the graph 3 (486.13 nm) are blocked by a coating lens means 120 without reaching the imaging plane and do not develop significant halo.

Figure 14:
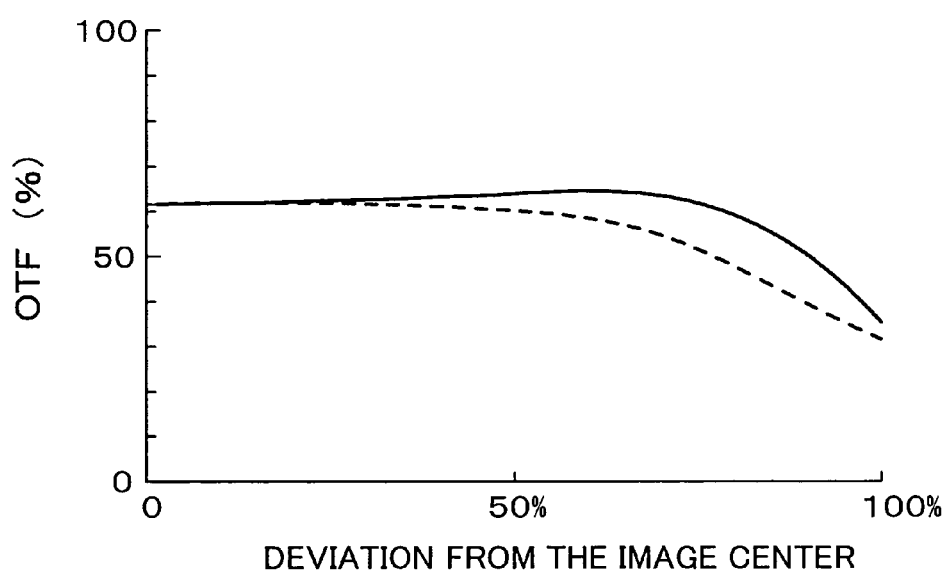
FIG. 14 is a graph where a geometrical optical OTF is at a level of 50/mm in the second embodiment of the imaging lens system according to the present invention.

FIG. 14 shows a geometrical OTF of 50/mm in the first embodiment of the imaging lens system. The horizontal axis denotes an incremented deviation from the image center while the vertical axis designates an OTF. The solid line in the graph is for a sagittal image surface while the broken line is for a meridional image surface.

Embodiment 3

Figure 3:
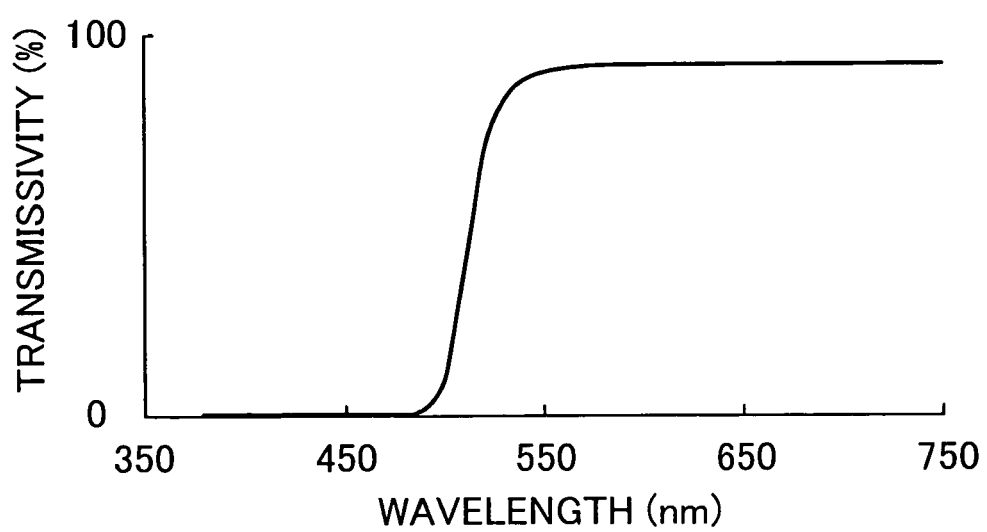
FIG. 3 is a graph of a transmissivity of the optical filter of which sixteenth and seventeenth surfaces from the foremost lens piece in the first embodiment of the imaging lens system are exemplary shown.

Described below will be a third preferred embodiment of the imaging optics capable of compensating chromatic aberration in accordance with the present invention. A focal length is 4.95 mm, and an F-number is 1.2. Although the imaging lens system incorporated in the third embodiment is similar to that in the first embodiment, the filter having the optical property of a uniform transmissivity as illustrated in FIG. 3 is replaced with an alternative filter having a light transmitting property that covers a broader wavelength range to block as it is closer to the outermost of its peripheral area.

Figure 15:
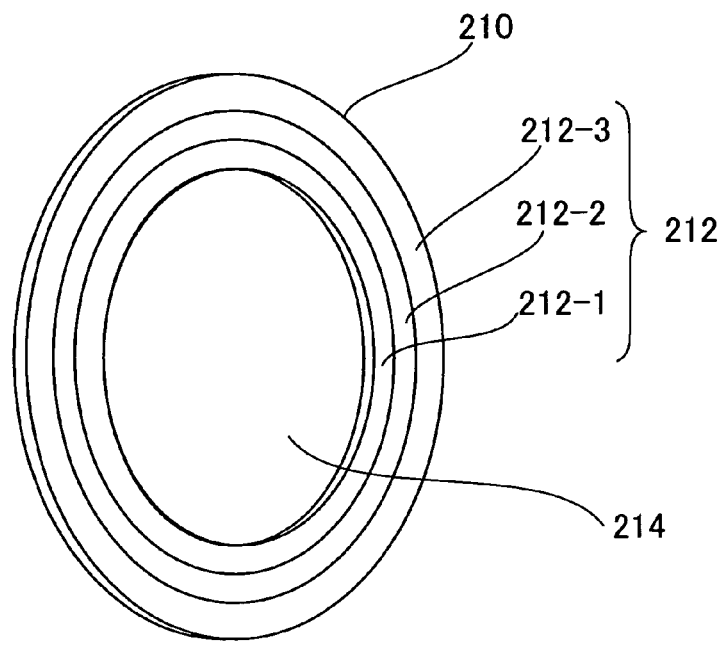
FIG. 15 is a perspective view of a lens piece having its part coated in a third embodiment of the imaging lens system.
Figure 16:
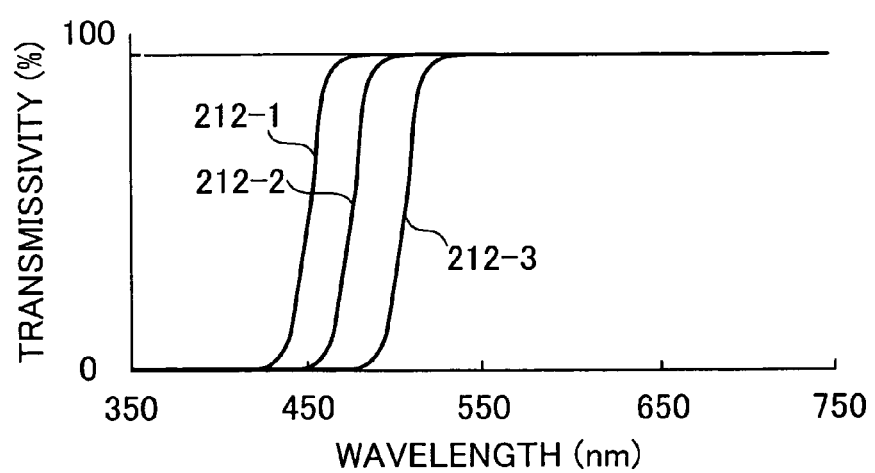
FIG. 16 is a graph of a transmissivity of a coating in the third embodiment of the imaging lens system according to the present invention.

FIG. 15 is a perspective view, which is a counterpart to the first embodiment of the imaging lens in FIG. 2, illustrating a disc-like optical filter 210. Peripheral filter elements 212-1, 212-2, and 212-3 of the filter 210, respectively shaped in doughnut as in FIG. 15, exhibit a light transmitting property that covers a broader wavelength range to block as it is closer to the outermost periphery. The center of the filter is a light transmitting area 214, which can be coated with an anti-reflection film, as required. FIG. 16 illustrates an optical property indicated by a transmissivity measured for the filter element 212-1, 212-2, and 212-3 at their respective center zones.

Figure 17:
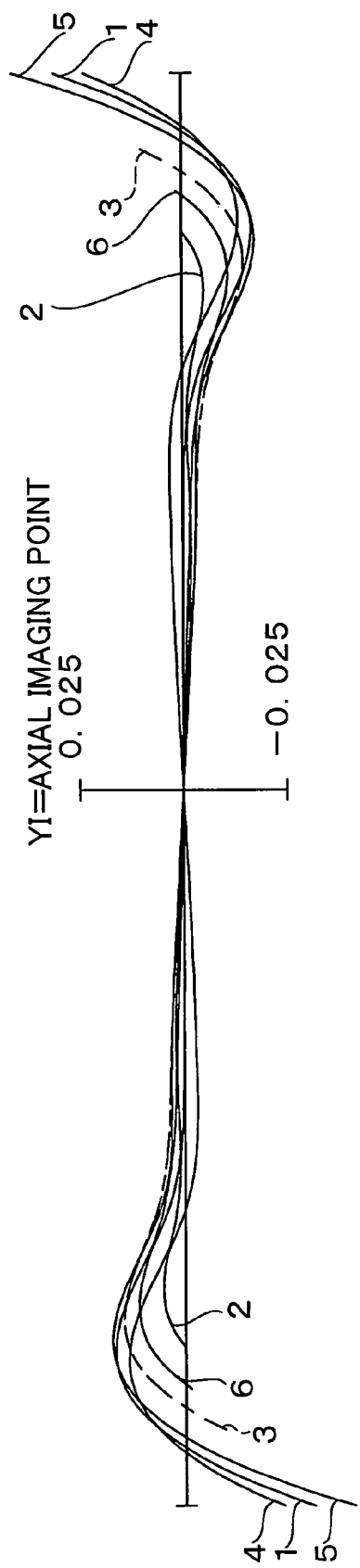
FIG. 17 depicts lateral aberration of an axial imaging point in the third embodiment of the imaging lens system according to the present invention.
Figure 18:
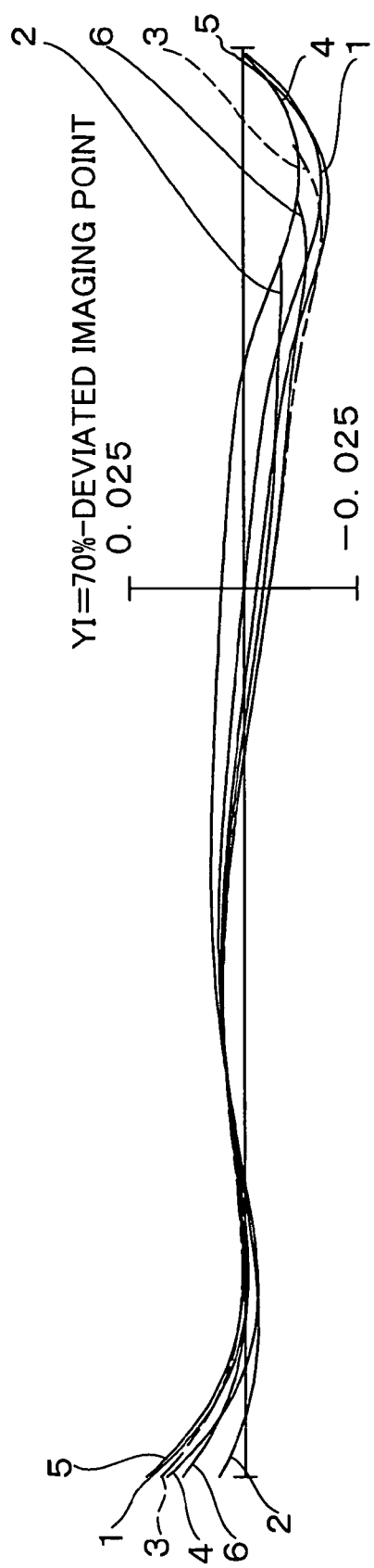
FIG. 18 depicts lateral aberration of a 70%-deviated imaging point in the third embodiment of the imaging lens system.
Figure 19:
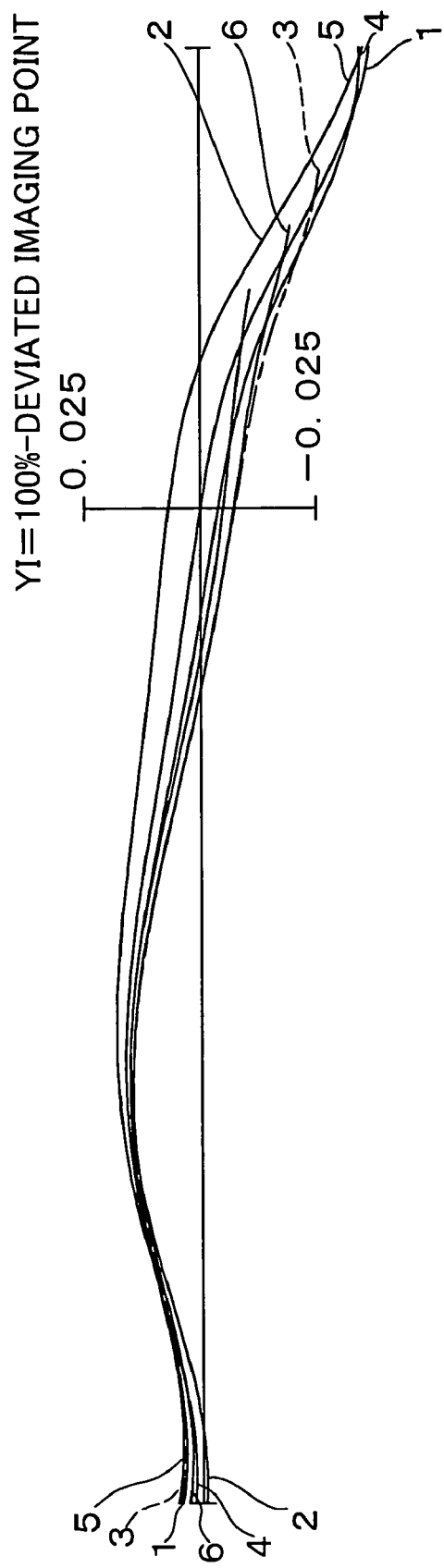
FIG. 19 depicts lateral aberration of a 100%-deviated imaging point in the third embodiment of the imaging lens system.

FIG. 17 to FIG. 19 depict lateral aberration of a third preferred embodiment of the lens system. In FIGS. 17 to 19, graphs 1 to 6 show lateral aberration for light beams of 587.56 nm wavelength, 435.84 nm wavelength, 486.13 nm wavelength, 656.28 nm wavelength, 546.07 nm wavelength, and 460.0 nm wavelength, respectively.

FIG. 17 depicts the lateral aberration of an axial imaging point. FIG. 18 depicts the lateral aberration of the 70%-deviated imaging point. FIG. 19 depicts the lateral aberration of the 100%-deviated imaging point. In these drawings of the aberration, rays of an incident light flux passing a peripheral area of the imaging lens system among those depicted in the graph 2 (435.84 nm), the graph 3 (486.13 nm), and the graph 6 (460.0 nm) are blocked by a filter means 212 without reaching the imaging plane and do not develop significant halo. Compared with the first and second embodiments, a considerable shielding effect is attained to part of the rays that would be to develop halo.

Alternatively, the optical filter in the third embodiment can be replaced with a doughnut-shaped glass plate appropriately disposed in position as the filter 212 is.

Another alternative to the optical filter in the third embodiment is in a manner that instead of coating the lens piece for the uniform transmissivity in the second embodiment, the coating exhibits a light transmitting property of covering a wider wavelength range to block as it is closer to the outermost periphery of the coating, so as to obtain the similar effects to those of the third embodiment.

Comparison Example 1

Given below are optical data of a prior art first exemplary imaging lens system that is compact, of large aperture, of reduced cost, and of high resolution. A focal length is 4.95 mm, an F-number is 1.2, and half a field angle is 38.1 degrees.

| Number of Lens Piece Surface | Radius of curvature | Distance | Nd | ν |
|---|---|---|---|---|
| 1 | 43.0000 | 1.2 | 1.77250 | 49.6 |
| 2 | 7.2750 | 4.5 | 1 | |
| 3 | −24.5703 | 0.8 | 1.69680 | 55.5 |
| 4 | 15.2361 | 0.5 | 1 | |
| 5 | 15.2392 | 2.1 | 1.84666 | 23.8 |
| 6 | 154.7140 | 5.7154 | 1 | |
| Aperture Stop | ∞ | 5.2065 | 1 | |
| 8 | 14.5746 | 3.5 | 1.63854 | 55.4 |
| 9 | −89.5954 | 0.15 | 1 | |
| 10 | 11.5187 | 2.5 | 1.63854 | 55.4 |
| 11 | 33.3420 | 1.4 | 1 | |
| 12 | −23.5330 | 0.6 | 1.84666 | 23.8 |
| 13 | 15.5161 | 2.6 | 1.58913 | 61.2 |
| 14 | −159.3129 | 0.2 | 1 | |
| 15 | 17.9428 | 3.1 | 1.58313 | 59.4 |
| 16 | −12.5328 | 1.5 | 1 | |
| 17 | ∞ | 3.5 | 1.51633 | 64.2 |
| 18 | ∞ | 6.781 | 1 | |
| Imaging Plane | ∞ | | | |

| The 15th Surface - Coefficient of Aspherical Surface | |
|---|---|
| a | 0 |
| b | −4.71971E−04 |
| c | −6.77838E−10 |
| d | 2.03670E−12 |
| e | 1.09188E−10 |

An aspherical surface can be figured with a radius of curvature R at the center of the surface and a positive direction x of the light progressing. Assuming that a height from the optical axis is designated by y, a variation in a direction of the optical axis (an axis passing the center in common for all pieces of lens elements) can be expressed in the formula as follows:

$$x = \frac{(1/R)Y^2}{1+\sqrt{1-(Y/R)^2}} + aY^2 + bY^4 + cY^6 + dY^8 + eY^{10} \quad (2)$$

Figure 20:
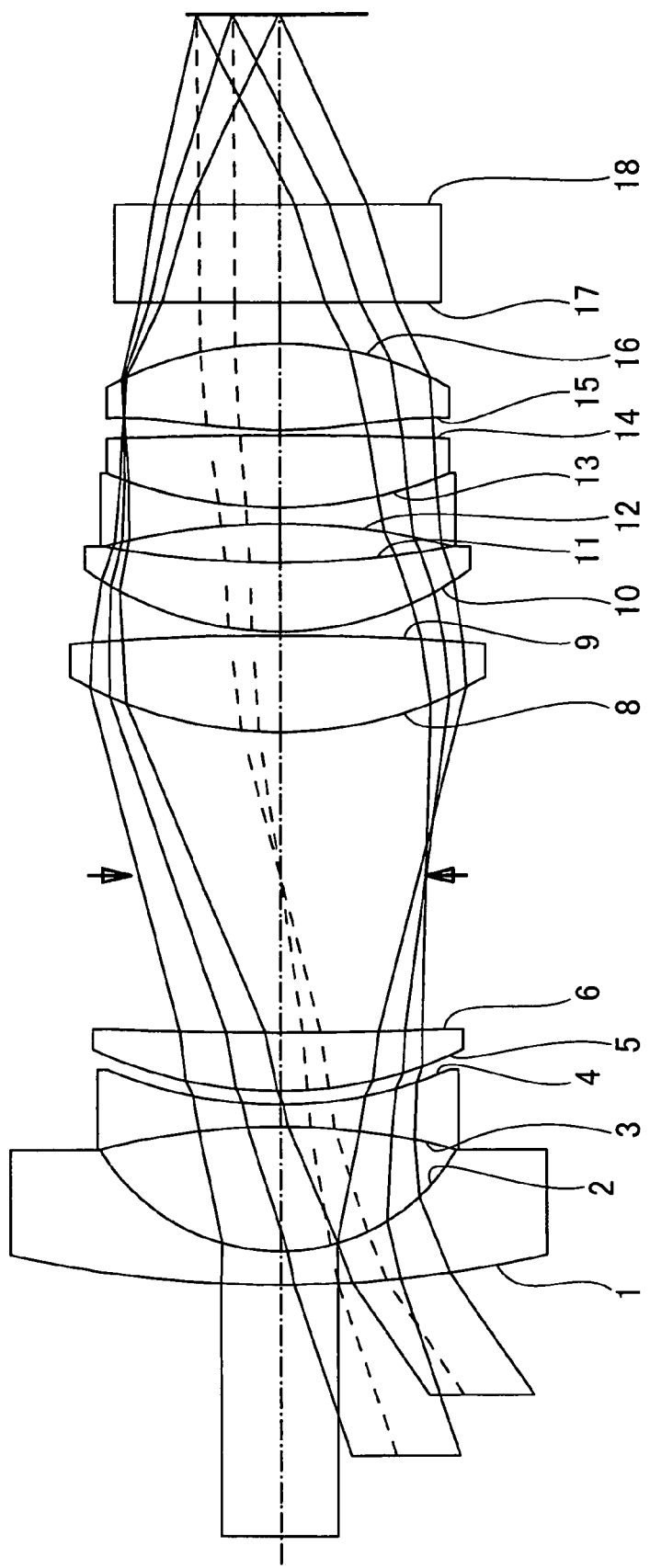
FIG. 20 is a diagram illustrating a prior art imaging lens system (comparison example 1)
Figure 21:
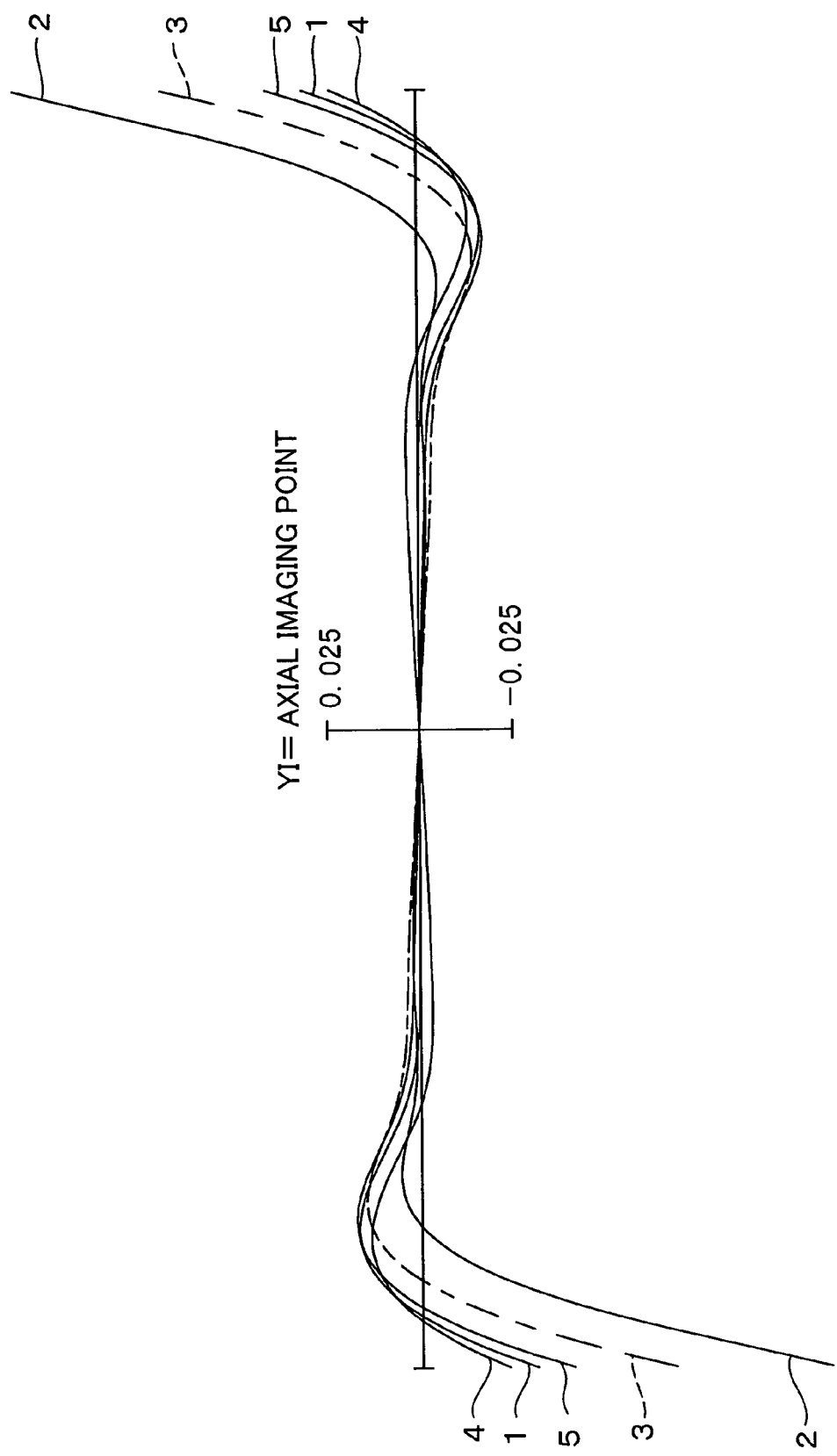
FIG. 21 depicts lateral aberration of an axial imaging point of the prior art imaging lens system (comparison example 1)
Figure 22:
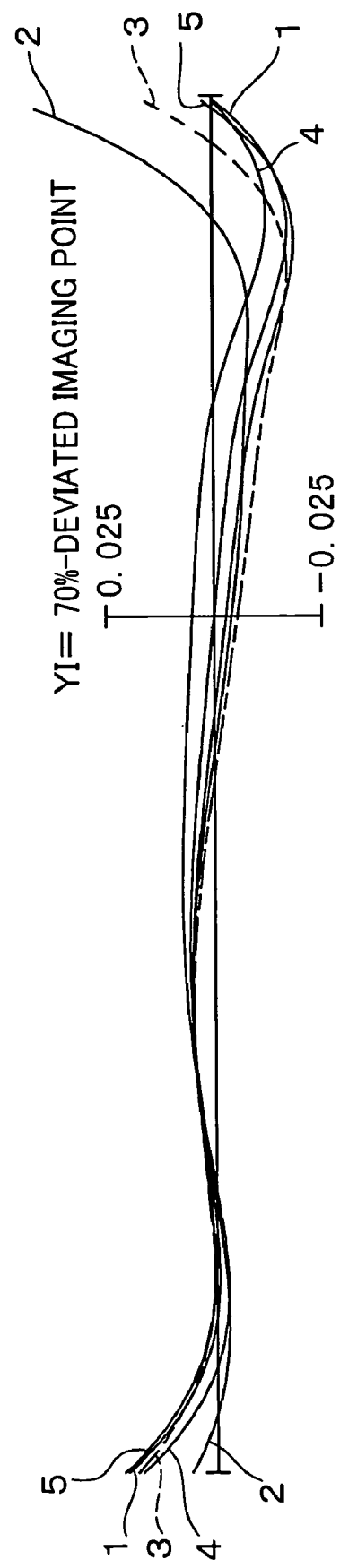
FIG. 22 depicts lateral aberration of a 70%-deviated imaging point in the prior art imaging lens system (comparison example 1)
Figure 23:
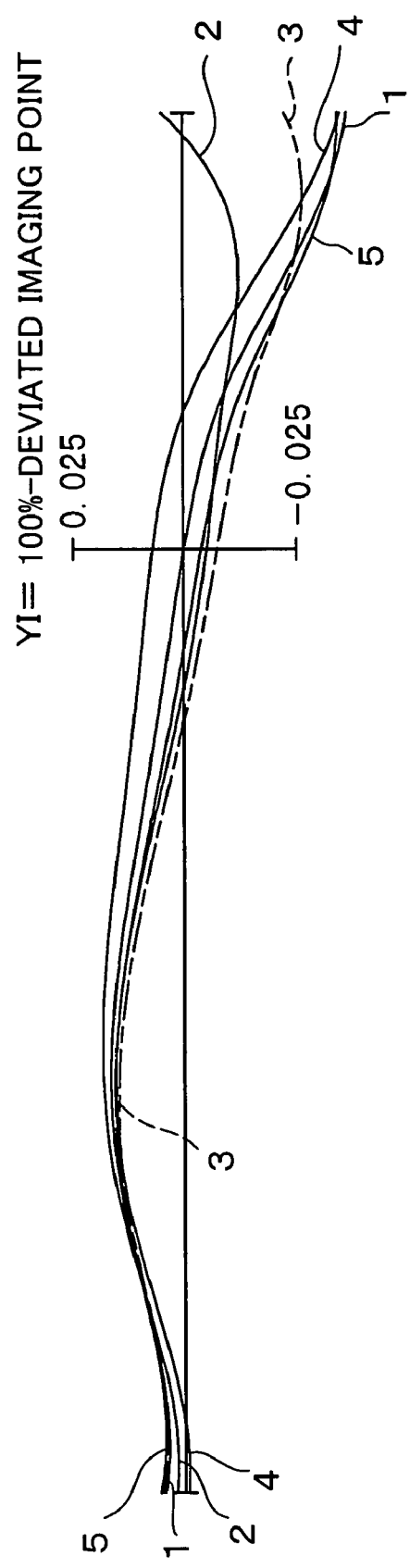
FIG. 23 depicts lateral aberration of a 100%-deviated imaging point in the third embodiment of the imaging lens system (comparison example 1)

FIG. 20 is a diagram illustrating the prior art imaging lens system. FIG. 21 to FIG. 23 depict lateral aberration of the above-mentioned prior art imaging lens system. In FIGS. 21 to 23, graphs 1 to 5 show lateral aberration for light beams of 587.56 nm wavelength, 435.84 nm wavelength, 486.13 nm wavelength, 656.28 nm wavelength, and 546.07 nm wavelength, respectively.

FIG. 21 depicts the lateral aberration of an axial imaging point. FIG. 22 depicts the lateral aberration of the 70%-deviated imaging point. FIG. 23 depicts the lateral aberration of the 100%-deviated imaging point. As will be recognized in these drawings of the aberration, rays of an incident light flux passing a peripheral area of the imaging lens system among those depicted in the graph 2 (435.84 nm) and the graph 3 (486.13 nm) develop extremely great spherical aberration and comatic aberration.

Figure 24:
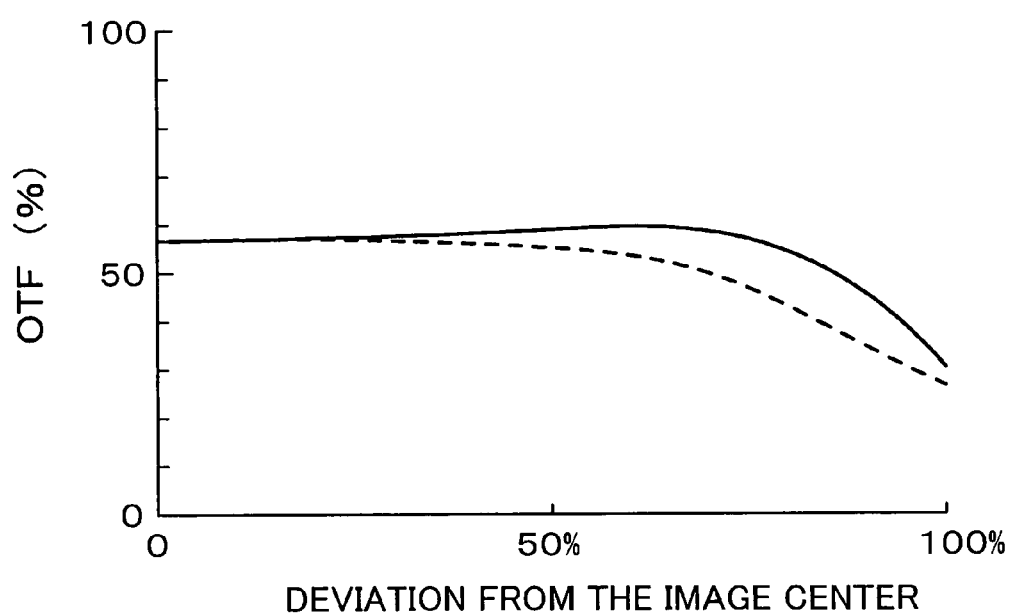
FIG. 24 is a graph where a geometrical optical OTF is at level of 50/mm in the prior art imaging lens system (comparison example 1)

FIG. 24 shows a geometrical OTF of 50/mm in the prior art embodiment of the imaging lens system. The horizontal axis denotes an incremented deviation from the image center while the vertical axis designates an OTF. The solid line in the graph is for a sagittal image surface while the broken line is for a meridional image surface.

Comparison Example 2

Figure 25:
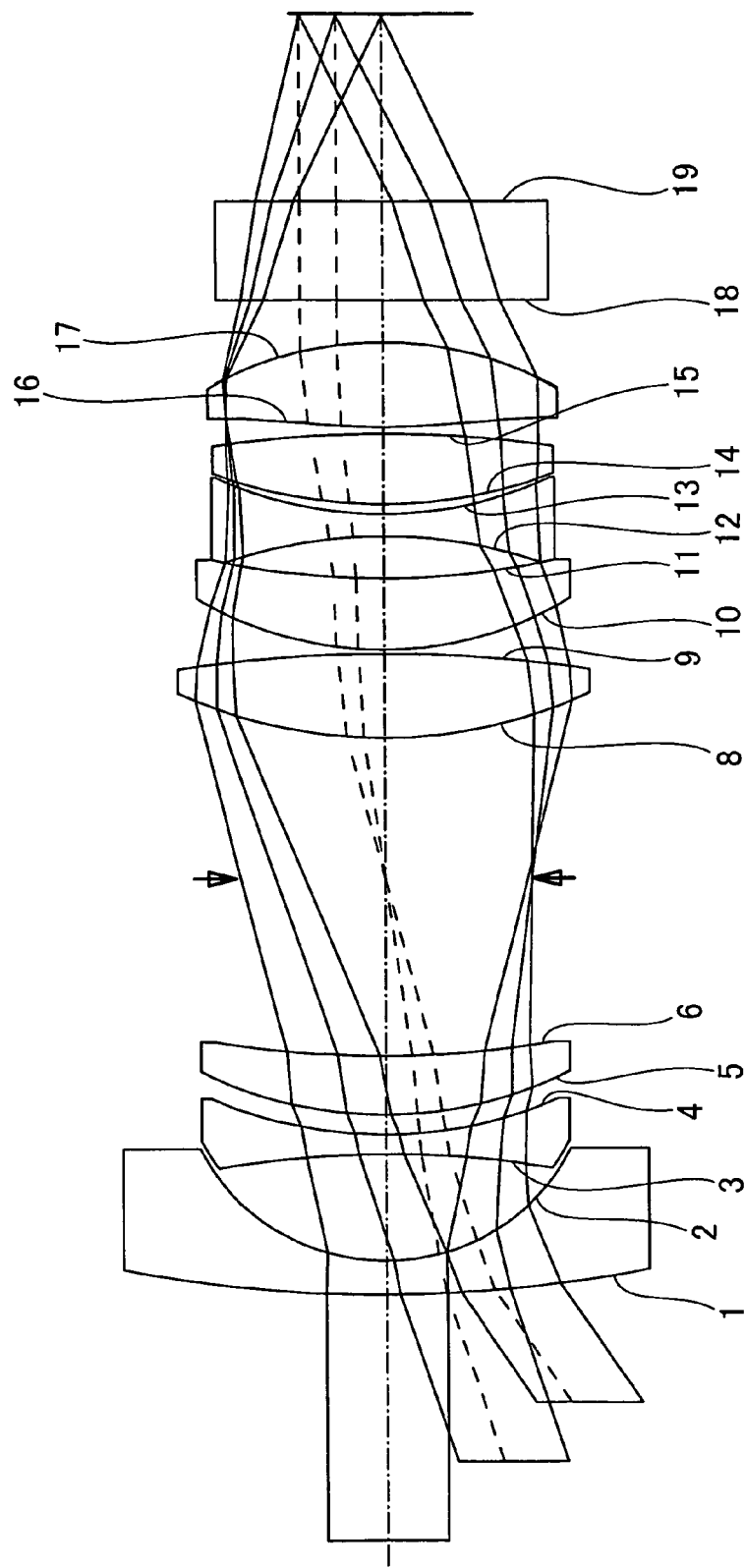
FIG. 25 is a diagram illustrating a prior art imaging lens system (comparison example 2)

Additional comparison example is, as shown in FIG. 25, a prior art second exemplary imaging lens system that is compact, of large aperture, of reduced cost, and of high resolution, and given below are optical data of a design that is the same in aperture ratio, number of pieces of lens element, lens thickness, and is well balanced between spherical and comatic aberrations and other aberrations. A focal length is 4.95 mm, an F-number is 1.2, and half a field angle is 38.1 degrees, which are all similar to those in Comparison Example 1. The second comparison example is dedicated to a reduction in flare in the graphs 2 and 3.

| Number of Lens Piece Surface | Radius of curvature | Distance | Nd | ν |
|---|---|---|---|---|
| 1 | 48.0000 | 1.2 | 1.77250 | 49.6 |
| 2 | 7.2921 | 3.8 | 1 | |
| 3 | −33.8400 | 0.7 | 1.61800 | 63.4 |
| 4 | 15.1154 | 0.7 | 1 | |
| 5 | 14.3104 | 2.1 | 1.92286 | 20.9 |
| 6 | 35.8215 | 6.3422 | 1 | |
| Aperture Stop | ∞ | 5.0333 | 1 | |
| 8 | 17.1033 | 3 | 1.80400 | 46.6 |
| 9 | −47.7195 | 0.15 | 1 | |
| 10 | 12.5922 | 2.55 | 1.69680 | 55.5 |
| 11 | 27.6424 | 1.5 | 1 | |
| 12 | −16.7589 | 0.8 | 1.84666 | 23.8 |
| 13 | 13.8443 | 0.35 | 1 | |
| 14 | 16.8516 | 2.5 | 1.58913 | 61.2 |
| 15 | −40.5321 | 0.25 | 1 | |
| 16 | 26.2121 | 3 | 1.69350 | 53.2 |
| 17 | −12.4047 | 1.5 | 1 | |
| 18 | ∞ | 3.5 | 1.51633 | 64.2 |
| 19 | ∞ | 6.586 | 1 | |
| Imaging Plane | ∞ | | | |

| The 16th Surface - Coefficient of Aspherical Surface | |
|---|---|
| a | 0 |
| b | −2.94300E−04 |
| c | 5.26562E−10 |
| d | −8.38218E−10 |
| e | −2.90585E−10 |

| The 17th Surface - Coefficient of Aspherical Surface | |
|---|---|
| a | 0 |
| b | −1.89930E−04 |
| c | 5.46842E−10 |
| d | −2.53685E−08 |
| e | 6.62361E−10 |

An aspherical surface can be figured with a radius of curvature R at the center of the surface and a positive direction x of the light progressing. Assuming that a height from the optical axis is designated by y, a variation in a direction of the optical axis (an axis passing the center in common for all pieces of lens elements) can be expressed in the formula as follows:

$$x = \frac{(1/R)Y^2}{1+\sqrt{1-(Y/R)^2}} + aY^2 + bY^4 + cY^6 + dY^8 + eY^{10} \quad (3)$$

Figure 26:
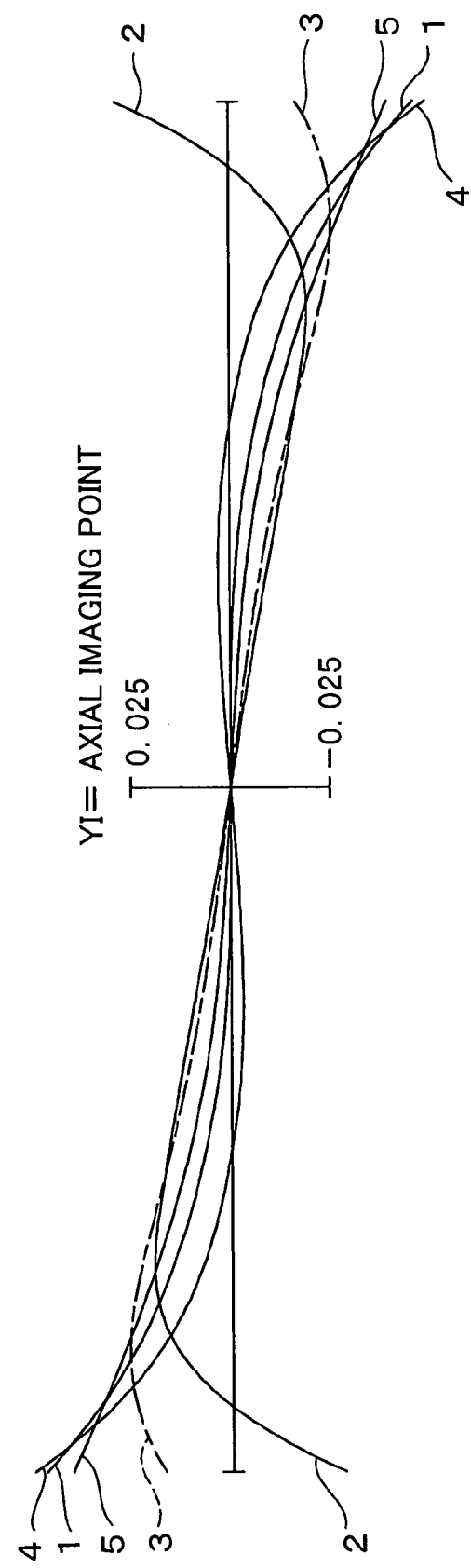
FIG. 26 depicts lateral aberration of an axial imaging point of the prior art imaging lens system (comparison example 2)
Figure 27:
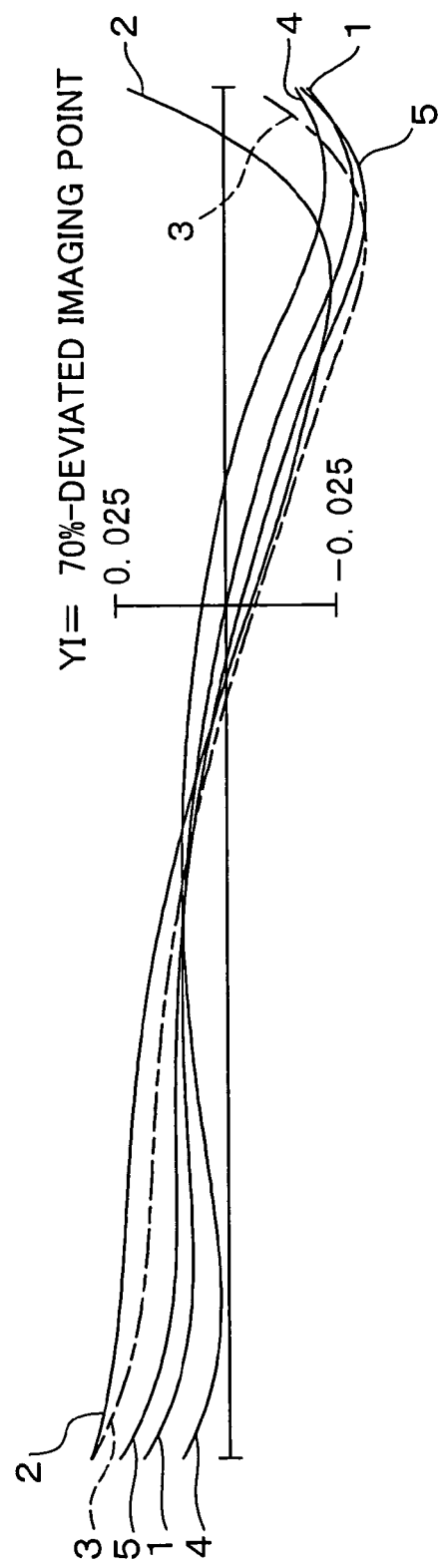
FIG. 27 depicts lateral aberration of a 70%-deviated imaging point in the prior art imaging lens system (comparison example 2)
Figure 28:
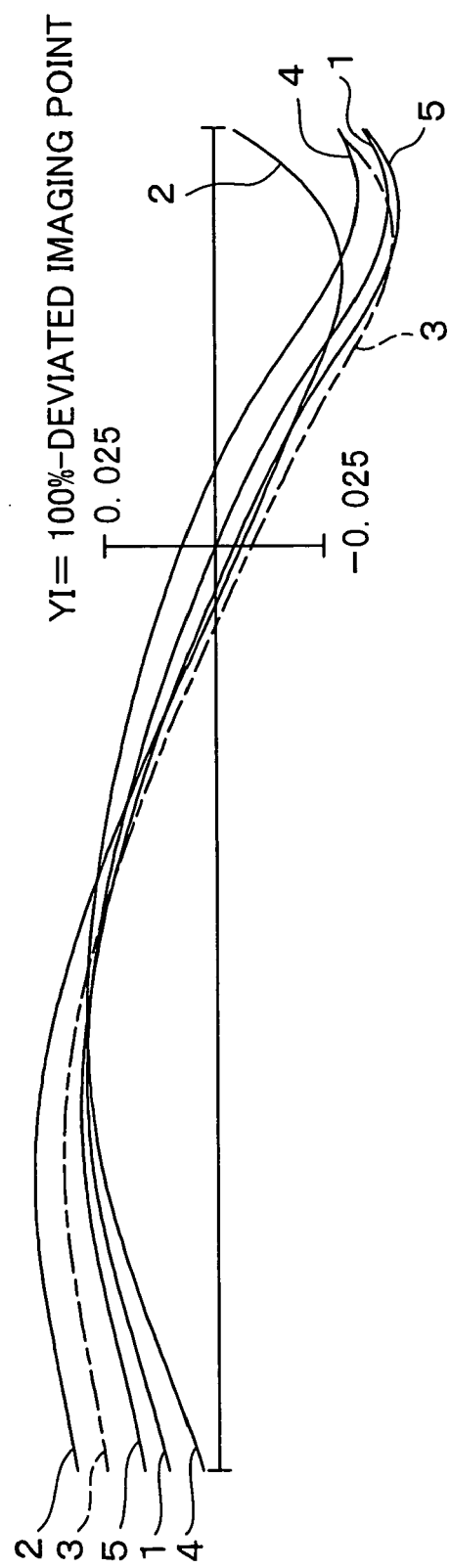
FIG. 28 depicts lateral aberration of a 100%-deviated imaging point in the third embodiment of the imaging lens system (comparison example 2)
Figure 29:
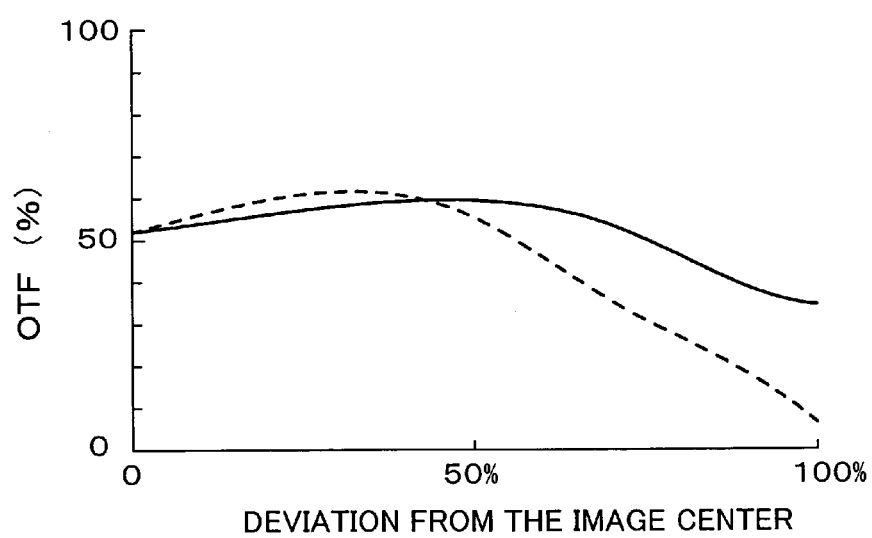
FIG. 29 is a graph where a geometrical optical OTF is at level of 50/mm in the prior art imaging lens system (comparison example 2).

FIG. 26 to FIG. 28 depict lateral aberration of the above-mentioned prior art imaging lens system in Comparison Example 2. Graphs 1 to 5 given therein are the same as in FIGS. 21 to 23. In contrast with FIG. 24, FIG. 29 shows a geometrical OTF of 50/mm in the imaging lens system of Comparison Example 2. The OTF in Comparison Example 2 is, as will be recognized in FIG. 29 given as a counterpart to FIGS. 7 and 14, considerably degraded in that a resolution is acutely reduced in or beyond the 50%-deviated point from the image center, compared with the OTF in Comparison Example 1.

In the aforementioned first to third embodiments, an optical filter, a coating, and a filter of varied blocked-wavelength or of varied transmissivity are respectively used as the light shielding means. The embodiments of the present invention are, however, not limited to these, but the invention can be implemented by any other replacement with a filter or coating means of the same functions and effects, such as coating, as desired, a transparent disc-like glass plate, coating an approximately doughnut-shaped glass, and the like.

The invention can apply to plastic lenses as well as the glass lenses in the optical lens system, and also to zoom lenses such as second, third and fourth groups of lenses from the foremost in addition to the large aperture, wide angle lens as in the above-mentioned embodiments. Moreover, the invention can cope with chromatic aberration in specified zones like halo in applications of a standard lens system and a telescopic system.

| EXPLANATION OF NUMERICAL REFERENCES | |
|---|---|
| O | optical axis |
| 110,210 | filter means |
| 114,214 | light transmitting area |
| 120 | coating |
| 122 | light transmitting area |

The invention claimed is:

1. An objective lens system comprising:
an aperture stop,
a fore objective lens group in front of the aperture stop, the fore objective lens group having a negative focal length and comprising at least two concave lenses and a convex lens,
a rear objective lens group behind the aperture stop, the rear objective lens group having a positive focal length and comprising a convex lens located immediately behind the aperture stop and a plurality of lens elements located behind the convex lens, the plurality of lens elements including a concave lens and a plurality of convex lenses, one of the plurality of lens elements being a rear lens element, wherein the fore objective lens group, the aperture stop, and the rear objective lens group are located in order from an objective side, and the aperture stop is located out of the imaging plane and shields a light flux passing through a peripheral area of the fore objective lens group, the rear objective lens group being configured to concentrate a portion of an incident light flux close to a limit line of the light flux from each respective imaging point into a peripheral area of the rear lens element, wherein for imaging points off of the optical axis, the concentrated portion of the incident light flux is close to the limit line of the light flux on an opposite side of the optical axis from the imaging point, and approximately annular light shielding means located behind the aperture stop in the peripheral area of the rear lens element where the portion of the incident light flux is concentrated, for non-circularly shielding the incident light flux from imaging points off of the optical axis and for eliminating lateral chromatic aberration components of a specified wavelength range of the incident light flux when the incident light flux passes the peripheral area of the rear lens element where the portion of the incident light flux is concentrated.

2. An objective lens system as defined in claim 1, wherein the light shielding means is an optical filter having a wavelength-selective absorber in its periphery.

3. An objective lens system as defined in claim 1, wherein the light shielding means is a coating having a wavelength-selective reflector in a superficial periphery of an optical element of the lens system.

4. An objective lens system as defined in claim 1, wherein the specified wavelength range is that of color blue.

5. An objective lens system as defined in claim 1, wherein the light shielding means exhibits a transmissivity property that the means covers a wider wavelength range to block as it is closer to the outermost periphery in the lens system.

6. An objective lens system as defined in claim 1, wherein the light shielding means is a planar optical filter having a substantially doughnut-shaped periphery coated to show a predetermined transmissivity.

7. An objective lens system as defined in claim 1, wherein the light shielding means is a coating layer provided in the lens element of the lens system, and the coating layer is in position of a peripheral area of the lens element, exhibiting a predetermined transmissivity.

8. An objective lens system comprising:
an aperture stop,
a fore objective lens group in front of the aperture stop, the fore objective lens group having a negative focal length and comprising at least two concave lenses and a convex lens, and
a rear objective lens group behind the aperture stop, the rear objective lens group having a positive focal length and comprising a convex lens located immediately behind the aperture stop and a plurality of lens elements located behind the convex lens, the plurality of lens elements including a concave lens and a plurality of convex lenses, wherein the fore objective lens group, the aperture stop, and the rear objective lens group are located in order from an objective side, and the aperture stop is located out of the imaging plane and shields a light flux passing through a peripheral area of the fore objective lens group, the rear objective lens group being configured to concentrate a portion of an incident light flux close to a limit line of the light flux from each respective imaging point into a peripheral area of a certain one of the lens elements, and such that rays of light incident on the peripheral area of the certain one of the lens elements make approximately the same incident angle as one another, wherein for imaging points off of the optical axis, the concentrated portion of the incident light flux is close to the limit line of the light flux on an opposite side of the optical axis from the imaging point, and approximately annular light shielding means located on the surface of the certain one of the lens elements in the peripheral area thereof where the portion of the incident light flux is concentrated and on an area of the surface of the certain one of the lens elements of the rear objective lens group in the vicinity of the position where the rays make approximately the same incident angle, for non-circularly shielding the incident light flux from imaging points off of the optical axis and for decreasing lateral chromatic aberration components of a specified wavelength of the incident light flux when the incident light flux passes the peripheral area of the surface of the certain one of the lens elements where the portion of the incident light flux is concentrated.

9. An objective lens system comprising:
an aperture stop,
a fore objective lens group in front of the aperture stop, the fore objective lens group having a negative focal length and comprising at least two concave lenses and a convex lens, and
a rear objective lens group behind the aperture stop, the rear objective lens group having a positive focal length and comprising a convex lens located immediately behind the aperture stop and a plurality of lens elements located behind the convex lens, the plurality of lens elements including a concave lens and a plurality of convex lenses, wherein the fore objective lens group, the aperture stop, and the rear objective lens group are located in order from an objective side, and the aperture stop is located out of the imaging plane and shields a light flux passing through a peripheral area of the fore objective lens group, the rear objective lens group being configured to concentrate a portion of an incident light flux close to a limit line of the light flux from each respective imaging point into a peripheral area of a certain one of the lens elements, and such that rays of light incident on the peripheral area of the certain one of the lens elements are approximately identical in height from the optical axis, wherein for imaging points off of the optical axis, the concentrated portion of the incident light flux is close to the limit line of the light flux on an opposite side of the optical axis from the imaging point, and approximately annular light shielding means located on the surface of the certain one of the lens elements in the peripheral area thereof where the portion of the incident light flux is concentrated and on an area of the surface of the certain one of the lens elements of the rear objective lens group in the vicinity of the position where the rays are approximately identical in height from the optical axis, for non-circularly shielding the incident light flux from imaging points off of the optical axis and for decreasing lateral chromatic aberration components of the incident light flux of a specified wavelength when the incident light flux passes the peripheral area of the surface of the certain one of the lens elements where the portion of the incident light flux is concentrated.

\* \* \* \* \*